US010843786B2

(12) United States Patent
Jörn et al.

(10) Patent No.: US 10,843,786 B2
(45) Date of Patent: Nov. 24, 2020

(54) REINFORCING ARRANGEMENT FOR AN OPENING IN AN AIRCRAFT STRUCTURE

(71) Applicant: Airbus Operations GmbH, Hamburg (DE)

(72) Inventors: Paul Jörn, Hamburg (DE); Claus Hanske, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 238 days.

(21) Appl. No.: 16/151,489

(22) Filed: Oct. 4, 2018

(65) Prior Publication Data

US 2019/0135405 A1 May 9, 2019

(30) Foreign Application Priority Data

Nov. 8, 2017 (DE) .......................... 10 2017 126 052

(51) Int. Cl.
*B64C 1/14* (2006.01)
*B64C 1/12* (2006.01)
*B64C 1/00* (2006.01)

(52) U.S. Cl.
CPC .............. *B64C 1/1461* (2013.01); *B64C 1/12* (2013.01); *B64C 2001/0072* (2013.01)

(58) Field of Classification Search
CPC .. B64C 1/1461; B64C 1/12; B64C 2001/0072
See application file for complete search history.

(56) References Cited

U.S. PATENT DOCUMENTS

| 8,146,863 | B2* | 4/2012 | Larcher | B64C 1/062 244/129.5 |
| 8,398,910 | B2* | 3/2013 | Kastner | B29C 70/30 264/258 |
| 2009/0146008 | A1* | 6/2009 | Thiele | B64C 1/1407 244/119 |
| 2009/0230246 | A1* | 9/2009 | Depeige | B64C 1/1492 244/129.3 |

(Continued)

FOREIGN PATENT DOCUMENTS

DE  10 2007 015 007 A1  10/2008
DE  10 2009 056 533 A1   6/2011

(Continued)

*Primary Examiner* — Valentina Xavier
(74) *Attorney, Agent, or Firm* — Lerner, David, Littenberg, Krumholz & Mentlik, LLP

(57) ABSTRACT

A reinforcing arrangement for an opening in an aircraft fuselage structure has a fuselage skin having an inner side, an outer side and a first opening with a first opening contour, and a one-piece reinforcing structure having a thickening section and at least one projecting profile. The first opening contour is surrounded on the inner side of the fuselage skin by an opening edge surface having a thickness corresponding to a thickness of the fuselage skin surrounding the opening edge surface. The thickening section has a bearing surface matched to the opening edge surface and has a receiving section facing away from the bearing surface and surrounding a second opening. The bearing surface is in surface contact with the opening edge surface, and the reinforcing structure is connected to the fuselage skin, with the result that the first opening and the second opening lie one above the other.

14 Claims, 5 Drawing Sheets

(56) References Cited

U.S. PATENT DOCUMENTS

| | | |
|---|---|---|
| 2011/0277924 A1 | 11/2011 | Bense |
| 2012/0001024 A1 | 1/2012 | Cruz Dominguez et al. |
| 2012/0211602 A1* | 8/2012 | Dugerie ................ B64C 1/1461 |
| | | 244/119 |
| 2016/0368583 A1 | 12/2016 | Yamamori |
| 2019/0326665 A1* | 10/2019 | Juergens .................. H01Q 1/12 |

FOREIGN PATENT DOCUMENTS

| | | |
|---|---|---|
| DE | 10 2009 057 012 A1 | 6/2011 |
| DE | 10 2010 014 265 B4 | 1/2013 |
| WO | 2008/015360 A1 | 2/2008 |
| WO | 2009/098088 A2 | 8/2009 |

\* cited by examiner

REINFORCING ARRANGEMENT FOR AN OPENING IN AN AIRCRAFT STRUCTURE

FIELD OF THE INVENTION

The invention relates to a reinforcing arrangement for an opening in an aircraft structure, to an aircraft having an aircraft fuselage structure and at least one opening situated therein, and to a method for producing a reinforcing arrangement for an opening in an aircraft fuselage structure.

BACKGROUND OF THE INVENTION

Vehicles are generally provided with one or more means of access to an interior which are capable of being closed. For this purpose, one or more openings are provided in an outer skin, these being fitted with movable doors or flaps. It is worthwhile to ensure adequate stability of the vehicle when producing an access opening in an outer skin of a vehicle by reinforcing the edge of the opening. Whereas, in the case of motor vehicles, the door openings are surrounded by a complex supporting structure, aircraft and especially passenger aircraft, for instance, have reinforced edge structures on door openings.

Reinforcing an outer skin of an aircraft in the region of a door opening is a known practice. This can be performed, for instance, by means of a reinforcing structure which runs around the door opening contour in some region or regions or completely. In the case of aircraft fuselages made from a metallic or fibre-reinforced material, there is a known practice of separately producing an additional reinforcing structure from the same material as the aircraft fuselage and then connecting it to an edge region of the opening by means of connecting elements. Apart from riveted joints, adhesively bonded joints may also be considered in this context.

DE 10 2009 057 012 A1 discloses a door surround arrangement for an aircraft fuselage structure having a fuselage skin, with which reinforcing elements are associated. Here, a door surround structure which delimits a door aperture is proposed.

BRIEF SUMMARY OF THE INVENTION

The separate production of a reinforcing structure and the connection thereof to the door surround can be very laborious, depending on the principle of connection. When using riveted joints, an adequately dimensioned load introduction region that leads to a harmonious design of the opening edge region and to adequate shear strength is furthermore required.

Consequently, one aspect of the invention proposes a structure reinforcing arrangement for an opening region in an aircraft fuselage structure which has smaller dimensions and with which it is possible to achieve a design that is appropriate to the flow of force and suitable for fibre composite construction and which allows simple manufacture.

A reinforcing arrangement for an opening in an aircraft fuselage structure is proposed. The reinforcing arrangement has a fuselage skin having an inner side, an outer side and a first opening with a first opening contour, and a reinforcing structure having a thickening section and at least one projecting profile. The first opening contour is surrounded on the inner side of the fuselage skin by an opening edge region, which has a thickness that corresponds to a thickness of the fuselage skin surrounding the opening edge surface. The thickening section has a bearing surface matched to the opening edge region and has a receiving section which faces away from the bearing surface and surrounds a second opening. The at least one projecting profile is arranged on the receiving section and extends in a direction away from the bearing surface. The reinforcing structure is in one piece. The fuselage skin and the reinforcing structure are composed of a fibre-reinforced plastic containing reinforcing fibres embedded in a plastic matrix, wherein the bearing surface is in surface contact with the opening edge surface, and the reinforcing structure is connected to the fuselage skin, with the result that the first opening and the second opening lie one above the other.

The fuselage skin should be interpreted as a component of the aircraft fuselage structure and can therefore be part of an elongated, cylindrical fuselage. The fuselage skin has reinforcing fibres which are embedded in a matrix material and, in particular, extend in several plies and in different directions in the plane of the fuselage skin. The reinforcing fibres can end at the first opening contour or can extend past said contour. The fuselage skin can be obtained by many different processes, e.g. by laying pre-impregnated semifinished fibre products, referred to as "pre-pregs" or other processes.

The first opening can be a door opening or an aperture in a door opening, for instance. By virtue of the reinforcing structure, the first opening can have a sufficiently robust structure which allows mounting of a movable door, for instance. For other types of opening too, e.g. window openings, a suitable reinforcing structure can be provided. Consequently, the reinforcing structure can be adapted to the specific use of the opening and can be of symmetrical or asymmetrical configuration, depending on the loads which occur and on the required endurance.

An opening edge region surrounding the opening is not necessarily a geometrically continuous surface but, within the scope of the invention, is a section on the inner side of the fuselage skin provided to receive the bearing region. The opening edge region can have different configurations, depending on the size and shape of the opening. By way of example, a strip-shaped opening edge region that surrounds the opening as a strip of constant width is conceivable. However, the opening edge region can also have narrowed or widened regions which allow the integration of intermediate ribs or the like.

The thickening section of the reinforcing structure is a substantially two-dimensional structure which is in direct surface contact with the opening edge region and the primary purpose of which is to locally increase the thickness of the fuselage skin in the opening edge region. This increases strength and damage tolerance. This can be worthwhile especially for door openings where shocks due to equipment presented externally to the door opening, e.g. steps or passenger boarding bridges on passenger aircraft, can occur. The thickening section can have a thickness which increases radially inwards and can be of the same order as the thickness of the fuselage skin. Normally, a base skin of an aircraft can have a thickness of about 1.2-2.5 mm. Additionally attached door corner reinforcements can have an additional thickness of over 15 mm.

The reinforcing structure can have a multiplicity of further structural elements, which lead to suitable reinforcement of the opening edge region. In particular, the reinforcing structure can be implemented in the manner of a frame which at least partially surrounds the second opening. A frame can be configured in the form of a flange that surrounds the second opening at a constant or variable distance from the bearing region and is connected to the fuselage skin by one or more structural elements arranged perpendicularly to the bearing region.

The reinforcing structure has a bearing surface on the thickening section, said bearing surface being connected to the opening edge region. It is understandable that the opening edge region and the bearing surface correspond to one another in their extent and shape. The particular advantage of the reinforcing structure produced in one piece, into which a thickening section has already been integrated, lies in the great flexibility in the fitting out of a fuselage skin with different reinforcing structures. As mentioned above, the fuselage skin can be provided with the same thickness in the region of the first opening as in other regions at a distance from the opening. It is therefore no longer necessary to integrate a thickened portion on an opening edge region into the fuselage skin itself; instead, this is achieved by connection to the reinforcing structure. Consequently, the possible positions of the thickened portion do not depend on predetermined positions of an apparatus by means of which the fuselage skin is manufactured. On the contrary, a first opening of arbitrary size can be provided at any desired locations in the fuselage skin, to which a reinforcing structure can then be attached separately. As a result, the configuration of the fuselage skin can even be adapted to customer-specific requirements without major expense.

The connection of the reinforcing structure to the fuselage skin can be achieved by any desired methods and connecting means, and these can also depend at least in part on the materials used for the reinforcing structure and the fuselage skin. By way of example, adhesive, riveted and welded joints and other material-joining methods, e.g. bringing uncured or pre-cured layers of the fuselage skin and of the reinforcing structure into contact and curing the reinforcing structure jointly with the fuselage skin, may be mentioned here.

In an advantageous embodiment, the reinforcing structure and the fuselage skin are connected to one another materially without a transition at the opening edge surface. The material joint without a transition should not be interpreted as an adhesive joint by means of a separate adhesive that has different mechanical properties from the matrix material both of the fuselage skin and of the reinforcing structure. On the contrary, "without a transition" should be interpreted in the sense that the combination of the reinforcing structure and the fuselage skin can be taken to be integral, at least in the opening edge region and on the bearing surface. This can also be achieved by local welding or co-consolidation of thermoplastic materials or of a material which is composed of a thermoplastic matrix with reinforcing fibres embedded therein. In other words, in this case the construction of the fuselage skin and of the reinforcing structure is indistinguishable from a component produced in one piece. In this variant, the reinforcing structure and the thickening section are of practically monolithic design. Consequently, the reinforcing structure and the fuselage skin therefore have excellent strength, robustness and capacity for uniform force flow, at least in the region around the first opening contour. This is advantageous particularly in a door region, where shocks on the opening edge region can be expected.

In an advantageous embodiment, the fuselage skin and the reinforcing structure are composed of a fibre-reinforced thermoplastic material. The separate manufacture of the fuselage skin and of the reinforcing structure and the mechanical connection thereof is thus easily possible. The two components can be connected materially to one another by being pressed against one another and by local heating of a joining region only. In this case, tools which allow the retention and/or pressing and the heating of the joining region to a welding temperature suitable for the thermoplastic material to be implemented should be used. These tools should be configured to ensure that the desired shape of the joining partners is retained under the effect of the heating. As an alternative, connection methods in which the fuselage skin and the reinforcing structure are fully heated and welded together would also be possible for this purpose.

The suitable thermoplastic materials can comprise PPS (polyphenylene sulphide), PEEK (polyetheretherketone), PEKK (polyetherketoneketone) or other materials. In particular, the reinforcing fibres could comprise carbon fibres.

In another advantageous embodiment, a plurality of first reinforcing fibres extends both within the bearing surface and within the projecting profile, wherein a plurality of second reinforcing fibres extends exclusively within the bearing surface and overlaps or is interleaved with the first reinforcing fibres. This provides improved tolerance for shock loading and furthermore improves the strength of the overall reinforcing structure. Weight and cost advantages can thereby be achieved.

In an advantageous embodiment, the first opening is larger than the second opening, wherein the thickening section supplements the fuselage skin on the outer side of the fuselage skin in a region between the first opening and the second opening. Consequently, the reinforcing structure forms part of the fuselage skin. This region between the first opening and the second opening can be formed by a peripheral strip which has a substantially constant width, for example. Consequently, the joint between the thickening section and the opening edge surface is spaced apart to a relatively significant extent from the second opening. During the operation of the aircraft, as already mentioned above, shocks on the actual access opening are to be expected when escalators or the like are moved up to the aircraft. If the joint is relocated at a distance from the second opening, only a region of the monolithic reinforcing structure which is not joined to the fuselage skin in a separate work step is therefore exposed to these shocks. Overall, this significantly increases the damage tolerance of the reinforcing arrangement in this variant. Another advantage is that the joining of the two structures is made easier by the better accessibility in the edge region and thus has a positive effect on any tolerance problems and on manufacturing costs.

An equally advantageous embodiment has a plurality of intermediate ribs, which are spaced apart and extend outwards radially from the projecting profile in a direction away from the opening contour and are connected integrally to the bearing region. The intermediate ribs, which are also known as "intercostals", can significantly reinforce the opening edge region. Furthermore, the intermediate ribs serve as supports, referred to as "doorstops", which are required to receive the aircraft door. The intermediate ribs can each have a flange which is arranged at a distance from the fuselage skin, extends parallel thereto and, with the fuselage skin, encloses one or more webs or partitions.

However, reinforcing elements that have a box-shaped profile, at least in some region or regions, are likewise conceivable instead of such ribs.

The fuselage skin can furthermore be produced from at least two shells. In this case, the opening edge surface is formed by more than one of the shells. The bearing surface of the reinforcing structure can be connected to this opening edge surface configured in this way. It is conceivable, at least in a partial region of the reinforcing arrangement, to dispense with possible tolerance compensating elements, which are often used when connecting large components composed of fibre-reinforced plastics. In the region of the opening edge surface, this task can be performed by the bearing surface. In this case, the bearing surface of the reinforcing structure can act as a "butt strap" and can enable the joining of two such shells, which are divided in the door region, with the minimum effort. This also results in cost and weight advantages.

The invention furthermore relates to a method for producing a reinforcing arrangement described above. In this case, the method preferably has the following steps:

preparing a fuselage skin composed of a fibre-reinforced plastic having an inner side, an outer side and a first opening with a first opening contour, wherein the first opening contour is surrounded on the inner side of the fuselage skin by an opening edge surface, which has a thickness that corresponds to a thickness of the fuselage skin surrounding the opening edge surface, preparing a reinforcing structure composed of a fibre-reinforced plastic having a thickening section and at least one projecting profile, wherein the thickening section has a bearing surface matched to the opening edge surface and has a receiving section which faces away from the bearing surface and surrounds a second opening, wherein the at least one projecting profile is arranged on the receiving section and extends in a direction away from the bearing surface, wherein the reinforcing structure is in one piece, and connecting the reinforcing structure to the fuselage skin in such a way that the bearing surface is brought into surface contact with the opening edge surface, and the reinforcing structure is connected to the fuselage skin, with the result that the first opening and the second opening lie one above the other.

The preparation of the fuselage skin and/or of the reinforcing structure is preferably carried out by producing semifinished products in an automated fibre deposition process and subsequent consolidation. A process of this kind can be carried out in a partially or fully automatic way by an apparatus in which endless fibres in the form of pre-pregs are laid in the desired manner. This can include cutting to size, forming and/or draping, layering and connecting in order to obtain a preform with a defined geometry. This can then be cured, possibly after a resin infusion process, if the exclusive use of pre-pregs is not intended, in an autoclave, presses or a similar curing tool. In addition to laying on a pure deposition tool, deposition directly on a curing tool is also possible. An automated fibre deposition process is known as "AFP" (automated fibre positioning).

The automated fibre deposition process can comprise direct deposition on a curing tool. This is referred to as "direct tool placement". The component, the reinforcing structure for instance, which is then cured, can then be cured without expensive measures.

The connection of the reinforcing structure to the fuselage skin can be carried out by various methods. These include, in particular, material-joining and positive-locking methods. Material-joining methods can comprise, in particular, welding if the plastic used for the fuselage skin and the reinforcing structure is a thermoplastic. The joining region of the fuselage skin and the reinforcing structure can be heated by inductive methods, the use of heating resistors, by transmission or by other methods.

The adhesive bonding or material connection without a transition by co-consolidation of the reinforcing structure and of the fuselage skin is another conceivable alternative.

When using thermoplastics, co-consolidation can take place, in particular, in a closed die in order to guarantee the shape of the joining partners.

The method can furthermore comprise the step of producing a first opening in the fuselage component at a predetermined position during the preparation of the fuselage component, and the step of positioning the reinforcing structure for the concentric alignment of the second opening and of the first opening before the step of connecting the fuselage component and the reinforcing structure. The first opening can be produced by the selective laying of semifinished fibre products before curing, for instance. As an alternative, it would furthermore be possible to produce the first opening by removing material from the fuselage component. However, this is not the preferred option. As mentioned above, the positioning and production of the first opening can be carried out according to customer requirements. Consequently, access openings in a fuselage are not predetermined by tools with rigid dimensions but can be positioned with almost complete freedom by virtue of the advantageous configuration of the reinforcing structure. This relates not only to the position of the first opening but also to the size thereof. This provides significant advantages in the production of different families of aircraft.

Connection can be implemented by means of a connection method from a group of connection methods, wherein the group comprises welding, riveting, adhesive bonding and co-consolidation.

The fuselage skin can be produced from two shells, and therefore the opening edge surface is formed by both shells. The reinforcing structure is connected to a first one of the shells, after which the two shells are subsequently connected to one another and the reinforcing structure is then connected to the second shell.

The invention furthermore relates to an aircraft having a fuselage with at least one fuselage component and at least one first opening arranged therein, which is implemented by means of at least one reinforcing arrangement according to the explanation above.

BRIEF DESCRIPTION OF THE DRAWINGS

Further features, advantages and possible uses of the present invention will emerge from the following description of the illustrative embodiments and the figures. In this context, all the features described and/or depicted form the subject matter of the invention, either in isolation or in any combination, irrespective of their combination in the individual claims or the dependency references thereof. In the figures, identical reference signs furthermore designate identical or similar objects.

DETAILED DESCRIPTION

Figure 1:
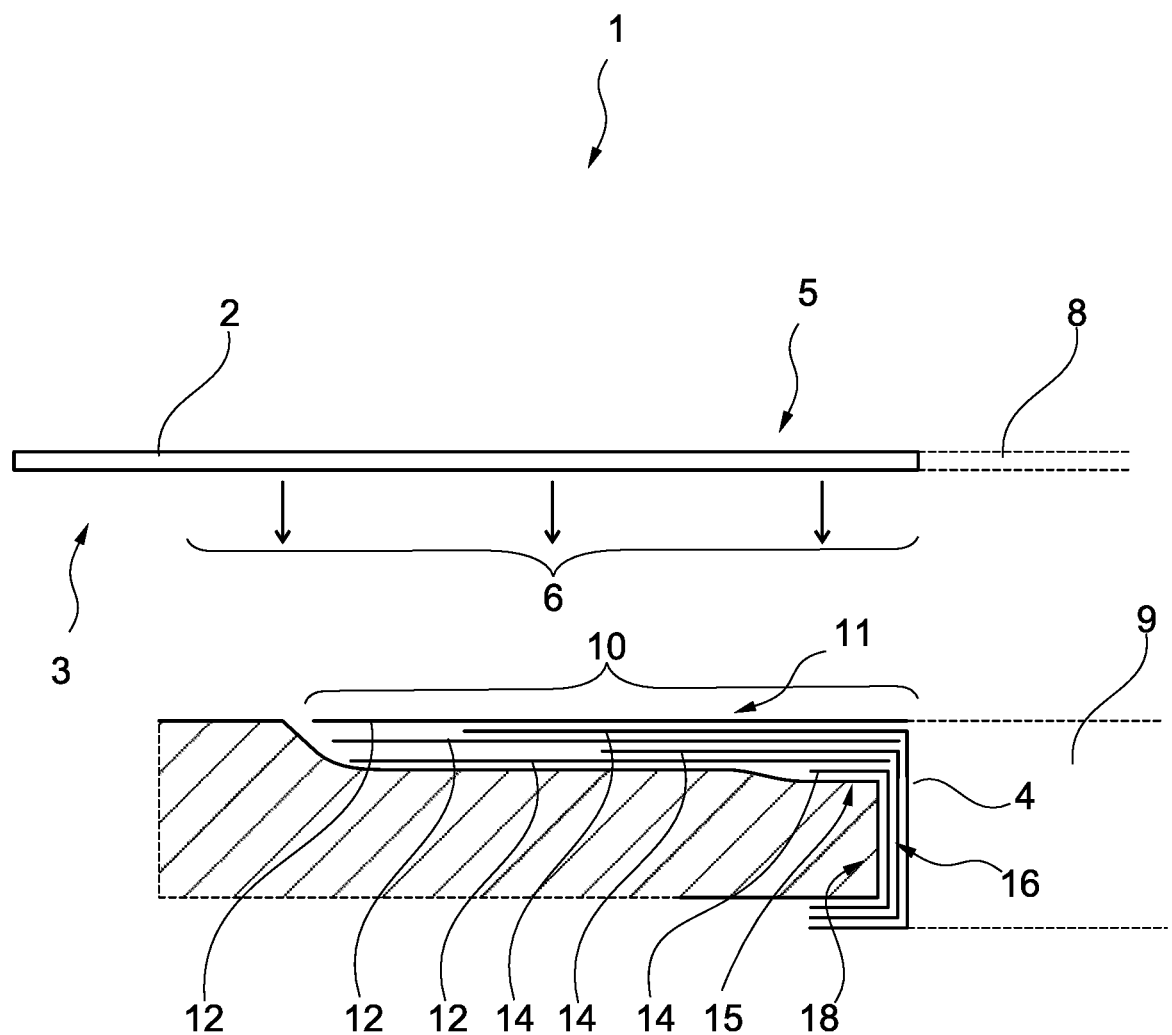
FIG. 1 shows a combination of a fuselage skin and a reinforcing structure in section from the side.

FIG. 1 shows schematically the production of a reinforcing arrangement 1 for an opening in an aircraft fuselage, e.g. a door opening. A fuselage skin 2 composed of a fibre-reinforced plastic is first of all prepared. Preparation can comprise complete manufacture of the fuselage skin 2 or, alternatively, just the preparation of a pre-cured semifinished fuselage skin. Furthermore, a reinforcing structure 4 is prepared, which is likewise produced from a fibre-reinforced plastic and can be embodied either as a finished component or as a pre-cured semifinished product.

The fuselage skin 2 can have a thickness of over one millimetre, e.g. between 1.4 and 1.6 mm. Depending on the vehicle size, design and intended use, greater and significantly greater thicknesses can also be implemented. A thickening of the edge around the first opening 8 is achieved locally by means of the thickening section 10.

The fuselage skin 2 has an inner side 3, an outer side 5 and an opening edge surface 6, which is not embodied or characterized geometrically in a special way in the example shown. The opening edge region 6 surrounds a first opening 8, which can form a door aperture, for example, and extends from the outer side 5 to the inner side 3 of the fuselage skin 2.

The reinforcing structure 4 has a thickening section 10 with a bearing surface 11, which is brought into surface contact with the opening edge surface 6. The reinforcing structure 4 has first reinforcing fibres 12 and second reinforcing fibres 14. Whereas the first reinforcing fibres 12 extend exclusively across the thickening section 10, the second reinforcing fibres 14 run from the thickening section 10 into a projecting profile 16. This extends transversely to the thickening section 10 and to the opening edge region 6 and has a projection 18, which is parallel to the thickening section 10, in some region or regions. A large second moment of area is thereby achieved, leading to reinforcement of an edge region around the first opening 8.

The first and second reinforcing fibres are in the form of a woven fibre structure, a non-crimped structure or an arrangement of individual fibres. The lines shown in FIG. 1 symbolize only a single fibre ply, which can consist of a multiplicity of fibres in different directions.

By way of example, the second reinforcing fibres 16 do not extend completely within the thickening section 10 but have a decreasing extent along the thickening section 10 with increasing distance from the opening edge region 6. Overall, the fibre plies formed by the first reinforcing fibres 12 and the second reinforcing fibres 14 overlap, thus ensuring very good force flow from the projection 18 into a plane parallel to the fuselage skin 2.

The reinforcing structure 4 provides a second opening 9, which extends laterally inwards from the projection 18. In the case shown, the size of the second opening 9 corresponds substantially to the size of the first opening 8.

As symbolized by the arrows, the fuselage skin 2 and the reinforcing structure 4 are placed one on top of the other and then connected to one another. This can be achieved by various methods, which, apart from material-joining methods, i.e. welding or co-consolidation, can also include positive-locking methods, e.g. riveting.

The hatched region within the reinforcing structure 4 can represent a fibre deposition tool, e.g. an automated fibre deposition tool. The reinforcing structure 4 can be produced thereon and then moved to the inner side 3 of the fuselage skin 2. Pre-produced reinforcing elements (intercostals) extending transversely thereto could also be laid in the apparatus, integrated and connected to the relevant other regions during deposition/consolidation.

Figure 2:
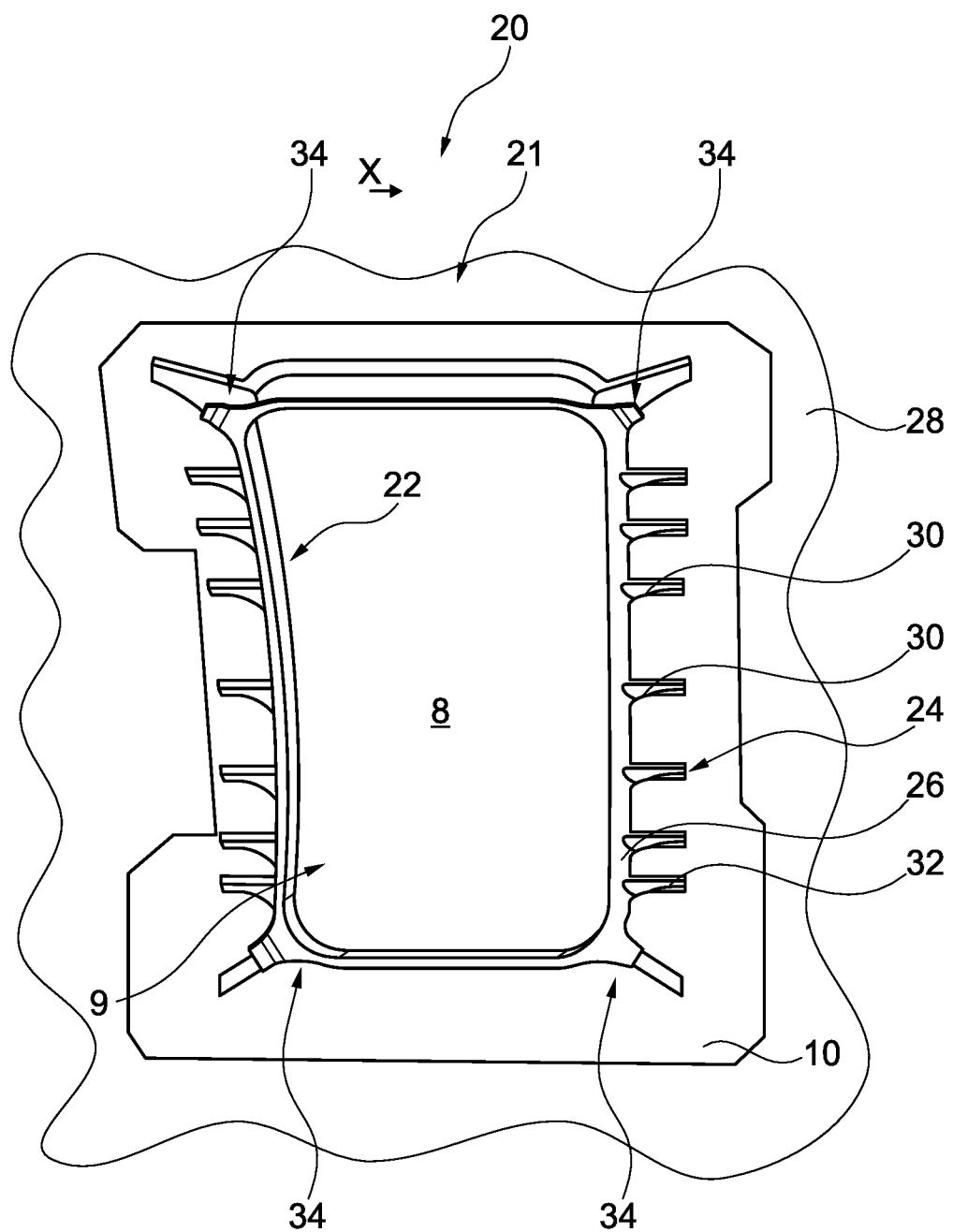
FIG. 2 shows a plan view of a reinforcing arrangement.

FIG. 2 shows an illustrative embodiment of a reinforcing arrangement 20 having a reinforcing structure 21 that has a somewhat more complex projection 22. This is joined radially on the outside by a plurality of intermediate ribs 24. These are spaced apart and, in particular, are arranged parallel to a longitudinal axis x of the fuselage skin 28. The intermediate ribs 24 each have a flange 26, which is arranged at a distance from the fuselage skin 28 and, with the latter, encloses a web 30. By way of example, there is a foot 32 on a side of each web 30 which faces the fuselage skin 28, said foot being wider than the web 30 and providing better load introduction into the fuselage skin 28.

It is self-evident that the fibre plies of the intermediate ribs 24 can be draped in order to form both the webs 30 and the flanges 26 and feet 32 or can form these in overlaps.

Furthermore, the reinforcing structure 21 can have corner reinforcements 34. In the illustration shown, the intermediate ribs 24 are arranged exclusively at the sides of the reinforcing structure 21 and at the corners. It is advantageous to provide a thickening section 34 which extends further from the projection 22 at the lower sides and the corners of the reinforcing structure 21 than at the sides. Overall, the reinforcing structure 21 can have a type of constriction on both sides, where the thickening section 34 is narrower. In this illustration, the character of the reinforcing structure 21 as a kind of patch is clear, being applied to a smooth semifinished fuselage skin to give a reinforcing arrangement on a fuselage skin.

In this illustration, door stops are not shown in detail. If the first opening 8 and the second opening 9 form a door opening, an aircraft door can be arranged on the reinforcing structure 21. To ensure that the door does not impose excessive stresses on a lock assembly and on the door bearing when closed and when the fuselage is pressurized, it rests on the door stops mentioned. These are normally arranged on the intermediate ribs 24.

Figure 3A:
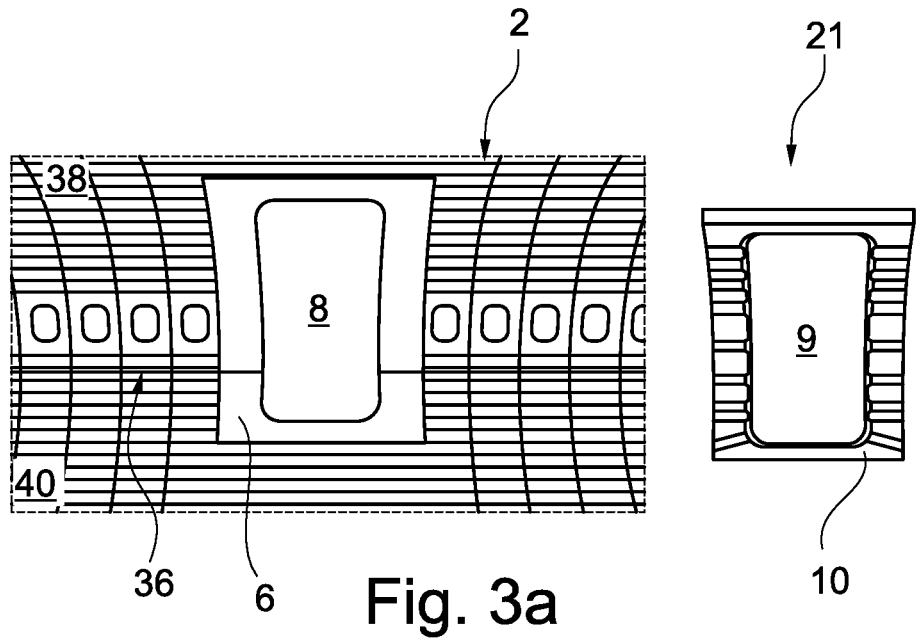
FIGS. 3a and 3b show two successive steps during the connection of a reinforcing structure and the fuselage skin.
Figure 3B:
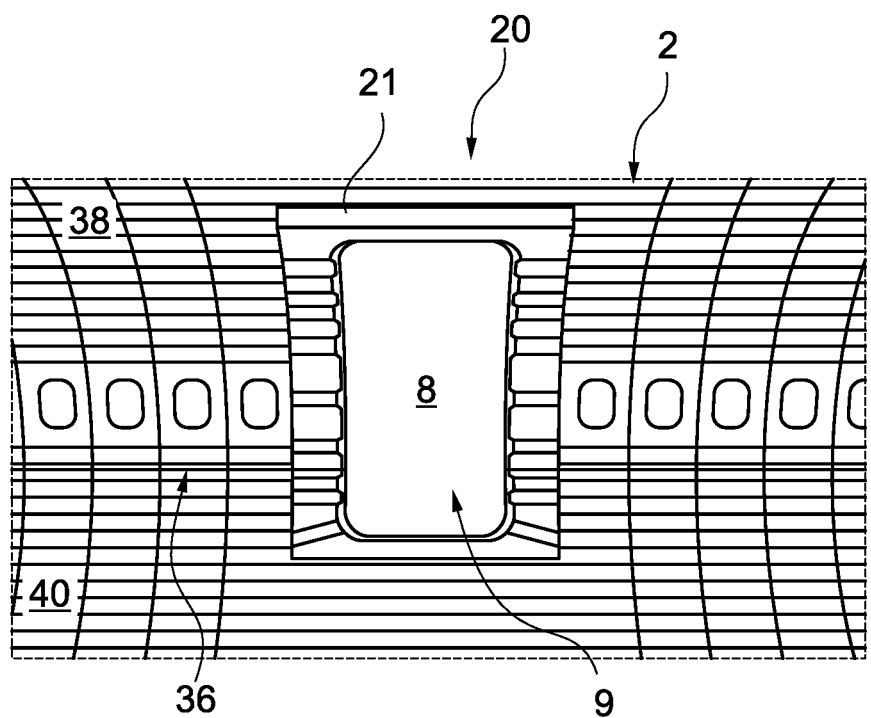

FIGS. 3a and 3b illustrate the arrangement of the reinforcing structure 21 at a joint 36 between two fuselage skin shells 38 and 40. When large components or shells of this kind are combined in the region of a first opening 8, it may be worthwhile to configure only one of the components as explained above. When implementing a door opening extending horizontally through the fuselage, the upper component 38 in the form of an upper shell can be connected to the reinforcing structure 21 in the form of a semifinished product, for instance. The remaining component 40 in the form of a lower shell 40 can then be connected to the reinforcing structure 21. The connection methods for connection to the upper shell 38 and the lower shell 40 do not necessarily have to be identical. Tolerance compensation of the two shells 38 and 40 can be accomplished in the region of the first opening 8 by means of the reinforcing structure.

Figure 4A:
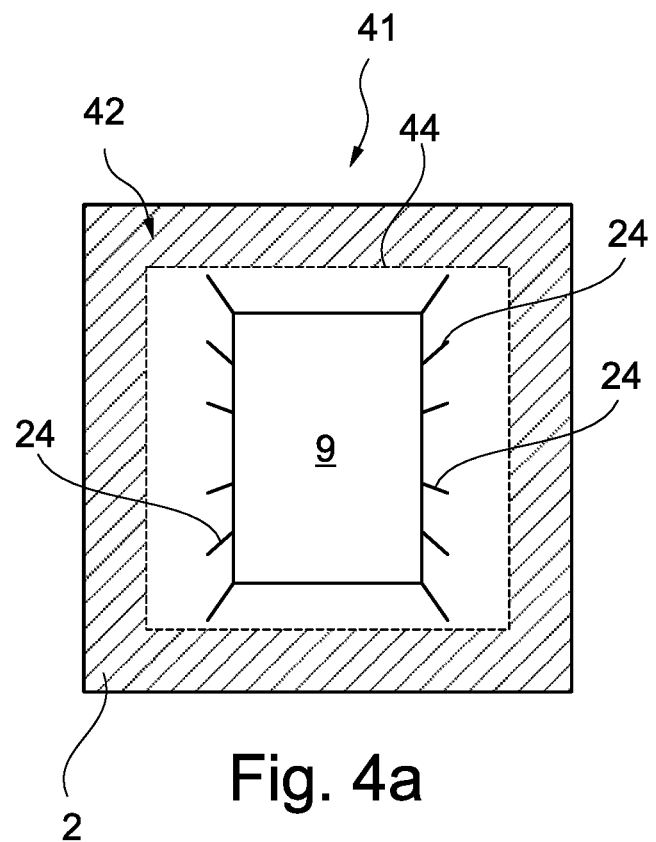
FIGS. 4a and 4b show another illustrative embodiment in different depictions.
Figure 4B:
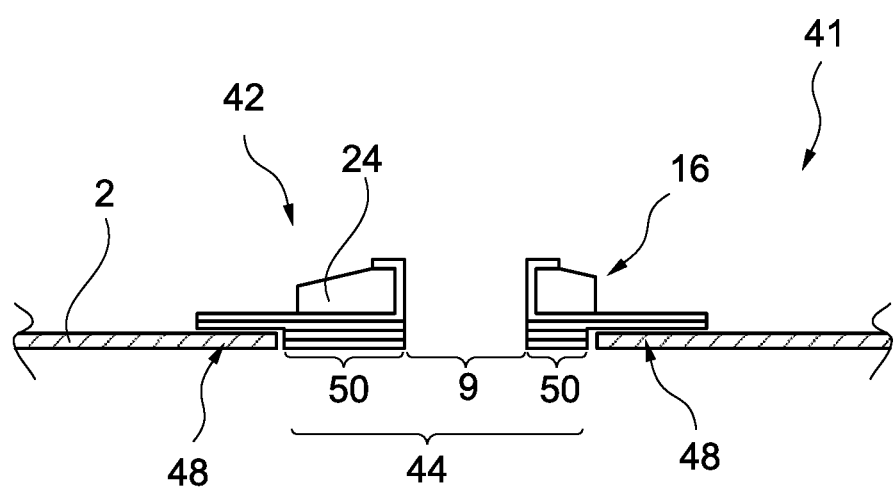

Finally, FIGS. 4a and 4b show another variant of reinforcing arrangement 41 having a reinforcing structure 42. The reinforcing structure 42 is substantially identical to the reinforcing structure 21 in the previous figures. However, a first opening 44 is provided in a fuselage skin 46, which is supplemented radially on the inside by the reinforcing structure 42, which provides a second opening 9, as in the previous figures.

The reinforcing structure 42 has a bearing surface 48, which is designed as a peripheral strip. Arranged radially on the inside is a thickening section 50, which carries the projecting profile 16. The actual access opening which extends through the fuselage is consequently formed exclusively by the reinforcing structure 42 and by the second opening 9. The region surrounding this second opening is monolithic and has a significantly improved damage tolerance for mechanical shocks from the outside on a second opening contour. The connection point between the fuselage component and the reinforcing structure 42 is radially further away from the access opening and is consequently out of a region in which mechanical shocks from the outside can be expected.

As already mentioned above, another particular advantage consists in that joining of the reinforcing structure 42 to the fuselage skin 2 is made easier by better accessibility in the edge region and thus has a positive effect on any tolerance problems and on the manufacturing costs.

Figure 5:
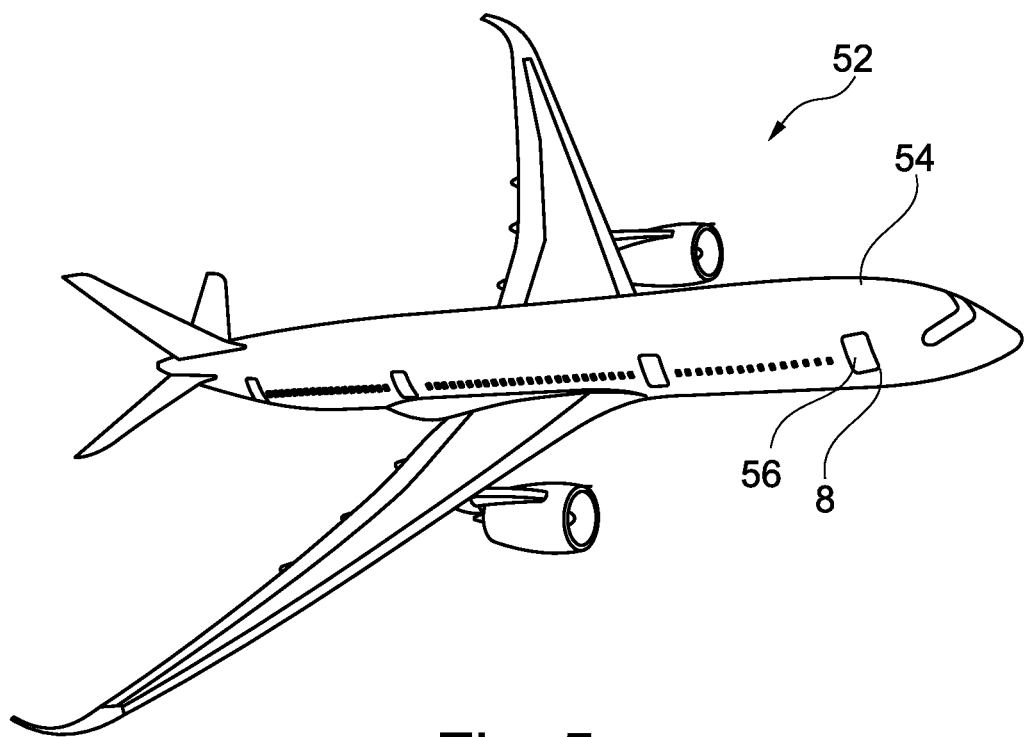
FIG. 5 shows an aircraft having a fuselage and an opening arranged therein, which is reinforced at the edge by a reinforcing arrangement according to the invention.

Finally, FIG. 5 shows, by way of example, an aircraft 52 having a fuselage 54 that has at least one fuselage skin 2. A first opening 8 in the fuselage skin 2 is indicated by way of example here. This can be taken to be representative of other first openings 8. In the example, the first opening 8 indicated is a door opening, and the reinforcing arrangement illustrated in the previous drawings is arranged on the inside (not shown). Consequently, the reinforcing arrangement can form a door reinforcement or a reinforced door frame, on which an aircraft door 56 is arranged. The first openings or second openings corresponding thereto are also conceivable, e.g. in the form of window openings. Consequently, the reinforcing arrangements concerned form reinforced window frames. The shape and embodiment of the aircraft 52 is not significant and is used only for purposes of illustration.

As a supplementary observation, it should be noted that "having" does not exclude other elements or steps, and "a" or "an" does not exclude a multiplicity. It should furthermore be noted that features which have been described with reference to one of the above illustrative embodiments can also be used in combination with other features of other illustrative embodiments described above. Reference signs in the claims should not be taken to be restrictive.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A reinforcing arrangement for an opening in an aircraft fuselage structure, comprising:
   a fuselage skin having an inner side, an outer side and a first opening with a first opening contour; and
   a reinforcing structure having a thickening section and at least one projecting profile,
   wherein the first opening contour is surrounded on the inner side of the fuselage skin by an opening edge surface having a thickness corresponding to a thickness of the fuselage skin surrounding the opening edge surface,
   wherein the thickening section has a bearing surface matched to the opening edge surface and has a receiving section facing away from the bearing surface and surrounding a second opening,
   wherein the at least one projecting profile is arranged on the receiving section and extends in a direction away from the bearing surface,
   wherein the reinforcing structure is in one piece,
   wherein the fuselage skin and the reinforcing structure comprises a fibre-reinforced plastic containing reinforcing fibres embedded in a plastic matrix, and
   wherein the bearing surface is in surface contact with the opening edge surface, and the reinforcing structure is connected to the fuselage skin, with the result that the first opening and the second opening lie one above the other.

2. The reinforcing arrangement according to claim 1, wherein the reinforcing structure and the fuselage skin are connected to one another materially without a transition at the opening edge surface.

3. The reinforcing arrangement according to claim 1, wherein the fuselage skin and the reinforcing structure are composed of a fibre-reinforced thermoplastic material.

4. The reinforcing arrangement according to claim 1,
   wherein a plurality of first reinforcing fibres extends both within the bearing surface and within the projecting profile, and
   wherein a plurality of second reinforcing fibres extends exclusively within the bearing surface and overlaps or is interleaved with the first reinforcing fibres.

5. The reinforcing arrangement according to claim 1,
   wherein the first opening is larger than the second opening, and
   wherein the thickening section supplements the fuselage skin on the outer side of the fuselage skin in a region between the first opening and the second opening.

6. The reinforcing arrangement according to claim 1,
   further comprising a plurality of intermediate ribs, which are spaced apart and extend radially from the projecting profile in a direction away from the opening contour.

7. The reinforcing arrangement according to claim 1, wherein the fuselage skin is produced from at least two shells, and the opening edge surface is formed by more than one of the shells.

8. A method for producing a reinforcing arrangement, comprising:
   preparing a fuselage skin comprising a fibre-reinforced plastic having an inner side, an outer side and a first opening with a first opening contour, wherein the first opening contour is surrounded on the inner side of the fuselage skin by an opening edge surface having a thickness corresponding to a thickness of the fuselage skin surrounding the opening edge surface;
   preparing a reinforcing structure comprising a fibre-reinforced plastic having a thickening section and at least one projecting profile, wherein the thickening section has a bearing surface matched to the opening edge surface and has a receiving section facing away from the bearing surface and surrounding a second opening, wherein the at least one projecting profile is arranged on the receiving section and extends in a direction away from the bearing surface, wherein the reinforcing structure is in one piece; and
   connecting the reinforcing structure to the fuselage skin in such a way that the bearing surface is brought into surface contact with the opening edge surface, and the reinforcing structure is connected to the fuselage skin, with the result that the first opening and the second opening lie one above the other.

9. The method according to claim 8, wherein the preparation of the fuselage skin and/or of the reinforcing structure is carried out by producing semifinished products in an automated fibre deposition process and subsequent consolidation.

10. The method according to claim 9, wherein the automated fibre deposition process comprises laying the semi-finished products directly on a curing tool.

11. The method according to claim 8, further comprising:
producing a first opening in the fuselage skin at a predetermined position during the preparation of the fuselage skin; and
positioning the reinforcing structure for the concentric alignment of the second opening and the first opening before the step of connecting the fuselage skin and the reinforcing structure.

12. The method according to claim 8, wherein connection is implemented by a connection method from a group of connection methods, the group consisting of:
co-consolidation;
welding;
riveting;
adhesive bonding or a combination thereof.

13. The method according to claim 8,
wherein the fuselage skin is produced from two shells, and the opening edge surface is formed by both shells, and
wherein the reinforcing structure is connected to a first one of the shells, after which the two shells are subsequently connected to one another and the reinforcing structure is then connected to the second of the shells.

14. An aircraft having a fuselage with at least one fuselage skin and at least one first opening arranged therein and a reinforcing arrangement according to claim 1.

* * * * *